US009569235B1

(12) United States Patent
Wang et al.

(10) Patent No.: US 9,569,235 B1
(45) Date of Patent: Feb. 14, 2017

(54) MANAGING VIRTUAL SYSTEMS IN DATA STORAGE SYSTEMS

(75) Inventors: Yidong Wang, Upton, MA (US); Deene A. Dafoe, Northborough, MA (US); Tianming Zhang, Hopkinton, MA (US); Weijing Song, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 588 days.

(21) Appl. No.: 13/249,372

(22) Filed: Sep. 30, 2011

(51) Int. Cl.
*G06F 9/455* (2006.01)
(52) U.S. Cl.
CPC .................. *G06F 9/45533* (2013.01)
(58) Field of Classification Search
CPC .................................................... G06F 9/45533
See application file for complete search history.

(56) References Cited

U.S. PATENT DOCUMENTS

| | | | |
|---|---|---|---|
| 2004/0167975 A1* | 8/2004 | Hwang | H04L 41/0213 709/223 |
| 2005/0038915 A1* | 2/2005 | Clarke et al. | 709/250 |
| 2005/0091068 A1* | 4/2005 | Ramamoorthy | H04L 41/0893 709/203 |
| 2011/0214115 A1* | 9/2011 | Kuusilinna et al. | 717/171 |

\* cited by examiner

*Primary Examiner* — Mengyao Zhe
(74) *Attorney, Agent, or Firm* — Krishnendu Gupta; Jason A. Reyes; Deepika Bhayana

(57) ABSTRACT

A method is used in managing virtual systems in data storage systems. First and second virtual systems are managed. The first virtual system uses a first format for communicating with a data storage system and the second virtual system uses a second format for communicating with the data storage system. A universal virtual system management module of the data storage system is used for communicating with the first and second virtual systems. The universal virtual system management module communicates with the first virtual system by using a first virtual system handler configured to communicate based on the first format. The universal virtual system management module communicates with the second virtual system by using a second virtual system handler configured to communicate based on the second format.

14 Claims, 15 Drawing Sheets

MANAGING VIRTUAL SYSTEMS IN DATA STORAGE SYSTEMS

BACKGROUND

Technical Field

This application relates to managing virtual systems in data storage systems.

Description of Related Art

Computer systems may include different resources used by one or more host processors. Resources and processors in a computer system may be interconnected by one or more communication connections. These resources may include, for example, data storage systems, such as the Symmetrix™ or CLARiiON™ (also referred to herein as Clariion) family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

In a common implementation, a Storage Area Network (SAN) is used to connect computing devices with a large number of storage devices. Management and modeling programs may be used to manage these complex computing environments.

Storage Management Initiative Specification (SMI-S), and Common Information Model (CIM) technologies, are widely used for managing storage devices and storage environments. CIM is described further below. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Logical Unit Numbers (LUNs), disks, storage subsystems, switches, and hosts. (In many, but not all cases, the term "volume" or "logical volume" is interchangeable with the term "LUN".) CIM also defines the associations that may or may not exist between these objects, such as a disk being associated to a storage subsystem because it physically resides in the storage subsystem.

The CIM objects mentioned above may be managed by a CIM object manager (CIMOM). A storage management software application can use a CIM client to connect to a CIMOM, to retrieve information about the storage entities that the CIMOM manages, and also to perform active configuration of the storage entities. Storage management software that uses a CIM client may be called a CIM client application. For example, SMI-S describes how a current storage LUN is mapped. A CIM server is a CIMOM and a set of CIM providers. The SMI-S describes several methods for assigning a LUN from a disk storage system to a host, or for adding a LUN to a disk storage system.

Virtual processing such as VMware is another known area that offers advantages in data processing, including in the area of apparent configuration to a user. It would be advancement in both the virtual processing and data storage arts to exploit better the respective individual capabilities for reaping more and better benefits for users in the respective fields.

SUMMARY OF THE INVENTION

A method is used in managing virtual systems in data storage systems. First and second virtual systems are managed. The first virtual system uses a first format for communicating with a data storage system and the second virtual system uses a second format for communicating with the data storage system. A universal virtual system management module of the data storage system is used for communicating with the first and second virtual systems. The universal virtual system management module communicates with the first virtual system by using a first virtual system handler configured to communicate based on the first format. The universal virtual system management module communicates with the second virtual system by using a second virtual system handler configured to communicate based on the second format.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
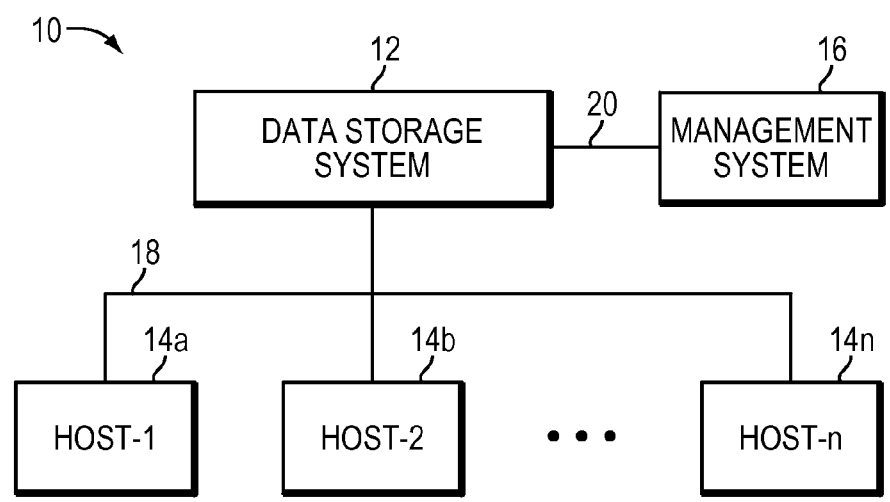
FIG. 1 is an example of an embodiment of a computer system that may utilize the techniques described herein.

Described below is a technique for use in managing virtual systems in data storage systems, which technique may be used to provide, among other things, managing first and second virtual systems, where the first virtual system uses a first format for communicating with a data storage system and the second virtual system uses a second format for communicating with the data storage system, and using a universal virtual system management module of the data storage system for communicating with the first and second virtual systems, where the universal virtual system management module communicates with the first virtual system by using a first virtual system handler configured to communicate based on the first format, where the universal virtual system management module communicates with the second virtual system by using a second virtual system handler configured to communicate based on the second format.

Generally, a data storage system communicates with a virtual server (e.g., a virtual data center manager client or simply referred to as "virtual client") in a virtual system infrastructure in order to retrieve information regarding storage properties of the virtual server. Further, a virtual system infrastructure may be provided by any one of the vendors such that examples of virtualization systems include commercial implementations, such as, for example and without limitation, VMware® ESX Server™ (VMware and ESX Server are trademarks of VMware, Inc.), VMware® Server, and VMware® vSphere™, available from VMware, Inc., Palo Alto, Calif.; operating systems with virtualization support; and open-source implementations such as, for example and without limitation, available from XenSource, Inc. Generally, a data storage system must provide a support for a set of interfaces and a virtual server structure that is defined by a vendor of a virtual system such that the virtual system can communicate with the data storage system using the set of interfaces and the virtual server structure.

Conventionally, a data storage system implements functionality in a vendor specific server management module that is required to support a virtual system such that the virtual system can communicate with the data storage system. Further, in such a conventional system, a data storage may communicate with different types of virtual system infrastructures such as VMware® vSphere™, Microsoft® Hyper-V™ Server, and Xen® Hypervisor. In such a conventional system, different types of virtual system infrastructures process storage system information differently based on a storage format used by each of the different virtual system infrastructures. Further, conventionally, a data storage system only implements support for VMware® virtual servers in a vendor specific server management module such that the vendor specific server management module can only be used to communicate with a virtual system infrastructure from VMware®. Further, even though a data storage system communicates with a virtual server based on a storage format that is used by the virtual server, the data storage system must translate storage structures and properties of the virtual server to a format that is used by the data storage system in order to manage information regarding the virtual server. As a result, in a conventional system, a set of common server management functionality that may be used by a data storage system for communicating with virtual servers from different vendors is duplicated in each vendor specific server management module used by the data storage system. Therefore, in such a conventional system, an amount of effort required to test each vendor specific server management module for each of the different types of virtual servers is duplicated. Further, in such a conventional system, creating a new vendor specific server management module for a new type of virtual server takes a longer time. Additionally, in such a conventional system, debugging issues in a vendor specific server management module takes a longer time because a set of functionality that is common to different types of virtual servers is combined with a set of functionality that is specific to a type virtual server thereby making maintenance of the vendor specific server management module prone to errors. Further, in such a conventional system, a vendor specific server management module must reside on a data storage system such that the data storage system is unable to offload a subset of processing for managing a virtual system to another system.

By contrast, in at least some implementations in accordance with the current technique as described herein, creating a unified virtual server management framework that includes a set of common management functionality such as functions and interfaces, and creating a specific handler module for a virtual server which includes a set of functionality that is specific to a type of the virtual server simplifies management of virtual systems in a data storage system. Further, in at least some implementations in accordance with the current technique as described herein, the unified virtual server management framework communicates with a specific handler module for managing a virtual system in the data storage system. Further, in at least some implementations in accordance with the current technique as described herein, a data storage system may use a proxy host system that may reside on a system other than the data storage system in order to offload a subset of processing for managing virtual systems to the proxy host.

Therefore, in at least some implementations in accordance with the current technique as described herein, the use of the managing virtual systems in data storage systems can provide one or more of the following advantages: decreasing an amount of overhead involved in creating a server management module for supporting a new type of virtual server by reusing a set of common server management functionality implemented by a unified server management module, decreasing an amount of time required to test a server management module by testing only a set of interfaces that are specific to the type of a virtual server, and decreasing an amount of overhead involved in debugging errors found when supporting a new type of a virtual server by creating a framework that maintains a set of common interfaces separate from a set of interfaces that are specific to a virtual server based on the type of the virtual server.

Referring now to FIG. 1, shown is an example of an embodiment of a computer system that may be used in connection with performing the storage mapping technique described herein. The computer system 10 includes one or more data storage systems 12 connected to servers (also referred to as hosts or host systems) 14a-14n through communication medium 18. At least one of the host systems 14a-14n includes or provides one or more virtual machines as described below. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or Fibre Channel connection. Further, in at least one embodiment of the current technique, the hosts systems 14a-14n may communicate with the data storage system 12 using an out of band communication medium such as Local Area Network (LAN) such that the host systems 14a-14n may be polled by a virtual system in order to retrieve storage system information from the data storage system 12.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of a variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 and in at least one of the host computers 14a-14n are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

Figure 2:
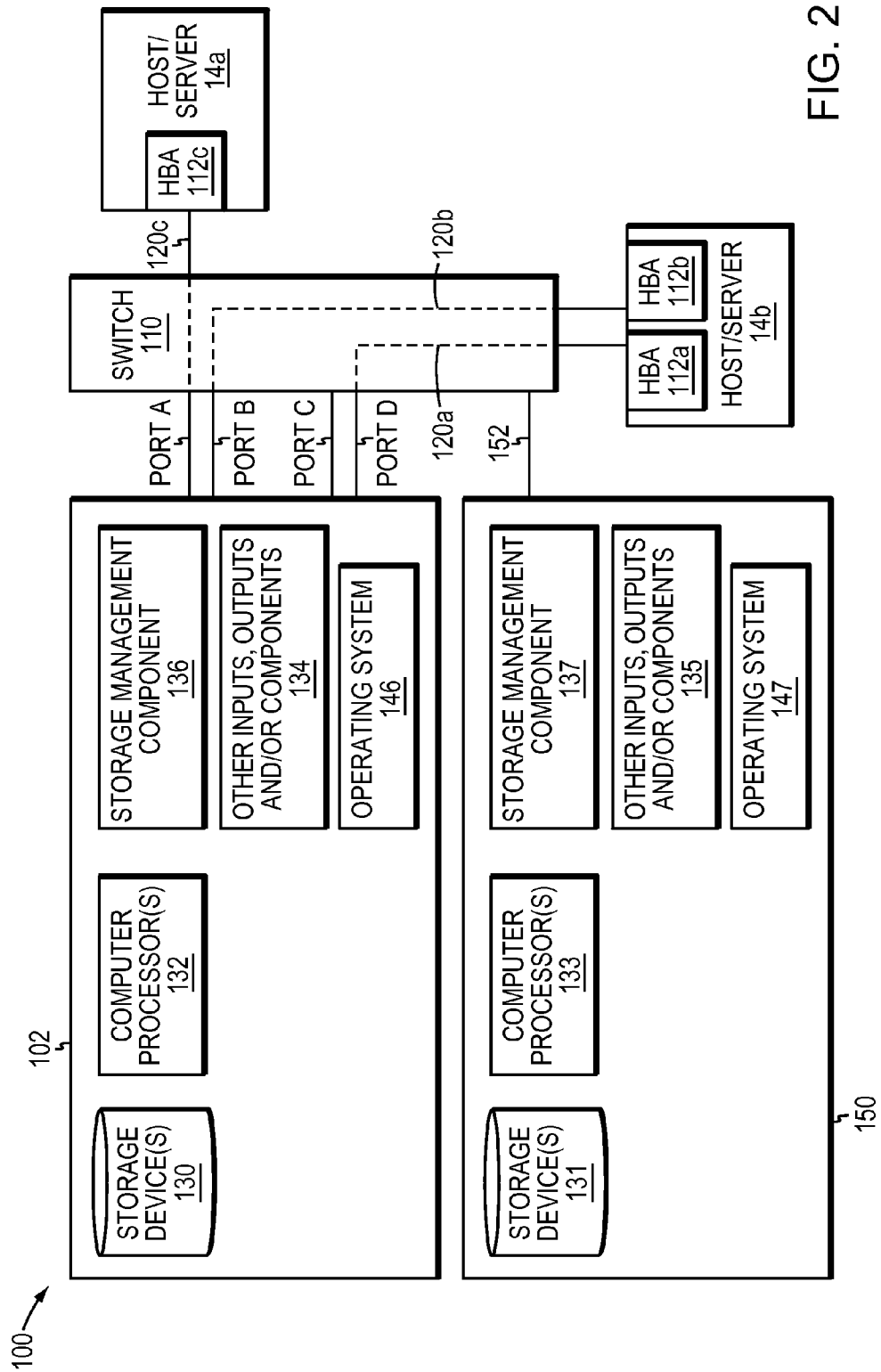
FIGS. 2-13 are block diagrams illustrating in more detail components that may be used in connection with techniques described herein.

Referring now to FIG. 2, shown is an example 100 of components that may be used in connection with the current technique described herein. The example 100 may represent components illustrated in connection of FIG. 1 configured in a storage area network (SAN). Included in the example 100 are data storage systems 102 and 150, a switch 110, and hosts or servers 14a and 14b. The switch 110 may be used in connection with facilitating communications between each of the hosts 14a and 14b and the data storage systems 102 and 150. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs.

Each HBA may include one or more ports although in the example illustrated, each HBA has only a single port. As represented with element 152, connections between the hosts using switch 110 may be made with respect to data storage system 150. Although only two data storage system are illustrated for purposes of simplicity in illustration, each of the hosts may have connections to other data storage systems in the SAN. Additionally, each host may be connected to the data storage systems 102, 150 using other connections, including direct cabling, than as illustrated in FIG. 2.

The data storage systems 102, 150 are illustrated as each including one or more storage devices 130, 131, one or more computer processors 132, 133, an operating system 146, 147, a storage management component 136, 137, and other inputs, outputs and/or components 134, 135, which may include all or some of other logic described below.

An example of an embodiment of the data storage system 102 is the CLARiiON™ data storage system by EMC Corporation which includes two computer processors as represented by the element 132 although an embodiment may include a different number of processors for use in connection with the storage mapping technique described herein.

The one or more storage devices 130 may represent one or more physical devices, such as disk drives, that may be accessed in logical units (e.g., as LUNs) as described elsewhere herein. The operating system 146 may be any one of a variety of commercially available, proprietary, or other operating system capable of execution by the one or more computer processors 132 in accordance with the particulars of the data storage system 102.

As used herein, the term network storage refers generally to storage systems and storage array technology, including storage area network (SAN) implementations, network attached storage (NAS) implementations, and other storage architectures that provide a level of virtualization for underlying physical units of storage. In general, such storage architectures provide a useful mechanism for sharing storage resources amongst computational systems. In some cases, computational systems that share storage resources may be organized as a coordinated system (e.g., as a cluster or cooperatively managed pool of computational resources or virtualization systems). For example, in a failover cluster it may be desirable to share (or at least failover) virtual machine access to some storage units. Similarly, in a managed collection of virtualization systems, it may be desirable to migrate or otherwise transition virtual machine computations from one virtualization system to another. In some cases, at least some computational systems may operate independently of each other, e.g., employing independent and exclusive units of storage allocated from a storage pool (or pools) provided and/or managed using shared network storage.

Generally, either or both of the underlying computer systems and storage systems may be organizationally and/or geographically distributed. For example, some shared storage (particularly storage for data replication, fault tolerance, backup and disaster recovery) may reside remotely from a computational system that uses it. Of course, as will be appreciated by persons of ordinary skill in the art, remoteness of shared storage is a matter of degree. For example, depending on the configuration, network storage may reside across the globe, across the building, across the data center or across the rack or enclosure.

While embodiments of the current technique, particularly cluster-organized and/or enterprise scale systems, may build upon or exploit data distribution, replication and management features of modern network storage technology, further embodiments may be used in more modest computational systems that employ network storage technology. For example, even a single computer system may employ SAN-type storage facilities in its storage architecture. Thus, while some embodiments utilize network storage that can be shared and while at least some underlying elements thereof may be remote, persons of ordinary skill in the art will understand that for at least some embodiments, network storage need not be shared or remote.

In some embodiments of the current technique, particularly those that use SAN-type storage arrays, block-level I/O access to virtual machine state data can afford performance advantages. Similarly, encapsulation and/or isolation techniques may be employed in some encodings of virtual machine state data to limit access (e.g., by a guest application or operating system) to underlying data. Accordingly, certain embodiments can be provided in which non-commingled, encapsulated representations of virtual machine state are maintained in distinct storage volumes (or LUNs) of a SAN. Nonetheless, other embodiments, including those that use NAS-type or file-system-mediated access mechanisms may still allow a virtualization system to leverage storage system functionality in support of operations such as virtual machine migration, movement, cloning, check pointing, rollback and/or failover using suitable codings of virtual machine state data.

For concreteness, embodiments are described which are based on facilities, terminology and operations typical of certain processor architectures and systems, and based on terminology typical of certain operating systems, virtualization systems, storage systems and network protocols and/or services. That said, the embodiments are general to a wide variety of processor and system architectures (including both single and multi-processor architectures based on any of a variety of instruction set architectures), to numerous operating system implementations and to systems in which both conventional and virtualized hardware may be provided. As described herein, the embodiments are also general to a variety of storage architectures, including storage virtualization systems such as those based on storage area network (SAN) or network attached storage (NAS) technologies.

Accordingly, in view of the foregoing and without limitation on the range of underlying processor, hardware or system architectures, operating systems, storage architectures or virtualization techniques that may be used in embodiments of the current technique are described. Based on these descriptions, and on the claims that follow, persons of ordinary skill in the art will appreciate a broad range of suitable embodiments.

Figure 3:
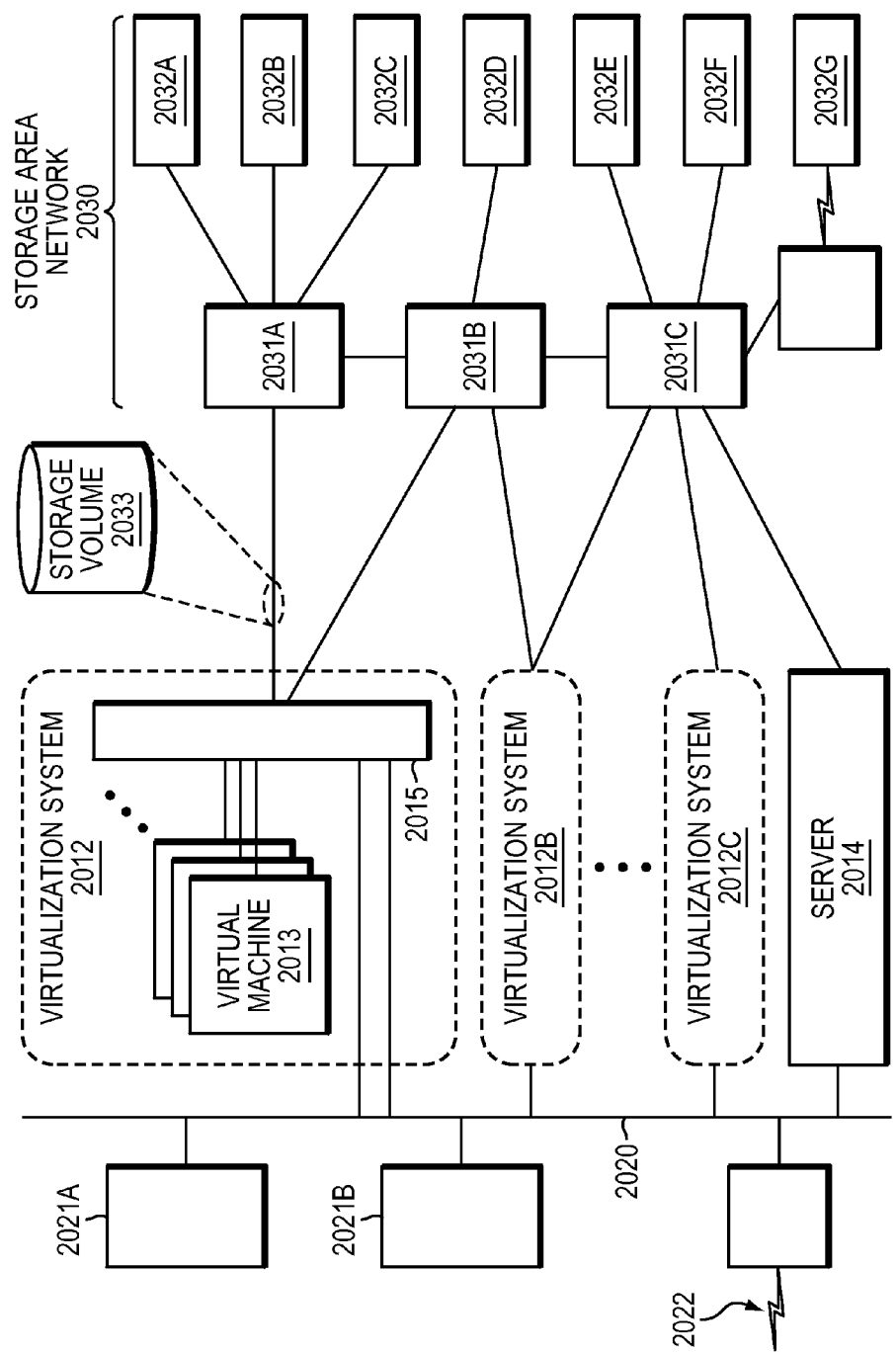

With respect to computational systems, generally, FIG. 3 depicts a collection or cluster of computational systems in which an embodiment of the current technique may be provided. In particular, FIG. 3 illustrates a collection or cluster in which at least a collection of virtualization systems 2012, 2012B, 2012C (but more generally, a mix of virtualization systems and conventional hardware systems such as server 2014) are configured to share storage resources. In the illustrated collection or cluster, constituent computational systems (e.g., virtualization systems 2012, 2012B, 2012C and server 2014) are coupled to network 2020 which is illustrated (for simplicity) as a local area network with client systems 2021A, 2021B and communications interface 2022, but will be more generally understood to represent any of a variety of networked information systems including configurations coupled to wide area networks and/or the Internet using any of a variety of communications media and protocols. One or more of systems 2012, 2012B, 2012C, 2014 may be, include, or be included in hosts 14a, 14b.

In the illustrated collection, storage area network (SAN) technology is used for at least some storage needs of computational systems participating in the collection. (The current technique can also be used for NAS storage allocated to a virtual machine environment.) In general, network storage systems (including SAN-based system 2030) provide a level of virtualization for underlying physical storage elements (e.g., individual disks, tapes and/or other media), where the characteristics and/or configuration of particular storage elements may be hidden from the systems that employ the storage. SAN-based systems typically provide an abstraction of storage pools from which individual storage units or volumes may be allocated or provisioned for block level I/O access. In the illustrated collection, a switched fabric topology consistent with Fibre Channel SAN technology is shown in which switches 2031A, 2031B, 2031C and/or directors are used to mediate high bandwidth access (typically using a SCSI, Small Computer System Interface, command set) to an extensible and potentially heterogeneous set of storage resources 2032A, 2032B, 2032C, 2032D, 2032E, 2032F, 2032G, e.g., SATA (Serial ATA) and/or SCSI disks, tape drives, as well as arrays thereof (e.g., RAID, i.e., Redundant Array of Inexpensive Disks). Such resources may be distributed and (if desirable) may provide data replication and/or off-site storage elements. Fibre Channel is a gigabit-speed network technology standardized in the T11 Technical Committee of the Inter National Committee for Information Technology Standards (INCITS). One or more of switches 2031A, 2031B, 2031C may be, include, or be included in switch 110. One or more of storage resources 2032A, 2032B, 2032C, 2032D, 2032E, 2032F, 2032G, may be, include, or be included in one or more of data storage systems 102, 150.

In general, a variety of different types of interconnect entities, including, without limitation, directors, switches, hubs, routers, gateways, and bridges may be used in topologies (or sub-topologies) that include point-to-point, arbitrated loop, switched fabric portions. Fibre Channel and non-Fibre Channel technologies including those based on iSCSI protocols (i.e., SCSI command set over TCP/IP) or ATA-over-Ethernet (AoE) protocols may be used in embodiments of the storage mapping technique. Similarly, any of a variety of media including copper pair, optical fiber, etc. may be used in a network storage system such as SAN 2030.

Although not specifically illustrated in FIG. 3, persons of ordinary skill in the art will recognize that physical storage is typically organized into storage pools, possibly in the form of RAID groups/sets. Storage pools are then subdivided into storage units (e.g., storage volumes 2033 that are exposed to computer systems, e.g., as a SCSI LUN on a SAN communicating via Fibre Channel, iSCSI, etc.). In some environments, storage pools may be nested in a hierarchy, where pools are divided into sub-pools. In at least some cases, the term LUN may represent an address for an individual storage unit, and by extension, an identifier for a virtual disk of other storage device presented by a network storage system such as SAN 2030.

Embodiments of the current technique may be understood in the context of virtual machines 2013 (or virtual computers) that are presented or emulated within a virtualization system such as virtualization system 2012 executing on underlying hardware facilities 2015. However, in addition, migration from (or to) a computational system embodied as a conventional hardware-oriented system may be supported in some systems configured in accordance with the current technique. Nonetheless, for simplicity of description and ease of understanding, embodiments are described in which individual computational systems are embodied as virtualization systems that support one or more virtual machines.

Although certain virtualization strategies/designs are described herein, virtualization system 2012 is representative of a wide variety of designs and implementations in which underlying hardware resources are presented to software (typically to operating system software and/or applications) as virtualized instances of computational systems that may or may not precisely correspond to the underlying physical hardware.

With respect to virtualization systems, the term virtualization system as used herein refers to any one of an individual computer system with virtual machine management functionality, a virtual machine host, an aggregation of an individual computer system with virtual machine management functionality and one or more virtual machine hosts communicatively coupled with the individual computer system, etc.

As is well known in the field of computer science, a virtual machine is a software abstraction—a "virtualization"—of an actual physical computer system. Some interface is generally provided between the guest software within a VM and the various hardware components and devices in the underlying hardware platform. This interface-which can generally be termed "virtualization layer"—may include one or more software components and/or layers, possibly including one or more of the software components known in the field of virtual machine technology as "virtual machine monitors" (VMMs), "hypervisors," or virtualization "kernels."

Because virtualization terminology has evolved over time, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself. However, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Embodiments are described and illustrated herein primarily as including one or more virtual machine monitors that appear as separate entities from other components of the virtualization software. This paradigm for illustrating virtual machine monitors is only for the sake of simplicity and clarity and by way of illustration. Differing functional boundaries may be appropriate for differing implementations. In general, functionality and software components/structures described herein can be implemented in any of a variety of appropriate places within the overall structure of the virtualization software (or overall software environment that includes the virtualization software).

With respect to the virtual machine monitor, in view of the above, and without limitation, an interface usually exists between a VM and an underlying platform which is responsible for executing VM-issued instructions and transferring data to and from memory and storage devices or underlying hardware. A VMM is usually a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

The VMM usually tracks and either forwards to some form of operating system, or itself schedules and handles, all requests by its VM for machine resources, as well as various faults and interrupts. An interrupt handling mechanism is therefore included in the VMM. As is well known, in the Intel IA-32 ("x86") architecture, such an interrupt/exception handling mechanism normally includes an interrupt descriptor table (IDT), or some similar table, which is typically a data structure that uses information in the interrupt signal to point to an entry address for a set of instructions that are to be executed whenever the interrupt/exception occurs. In the Intel IA-64 architecture, the interrupt table itself contains interrupt handling code and instead of looking up a target address from the interrupt table, it starts execution from an offset from the start of the interrupt when a fault or interrupt occurs. Analogous mechanisms are found in other architectures. Based on the description herein, interrupt handlers may be adapted to correspond to any appropriate interrupt/exception handling mechanism.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual timers are presented as part of a VM for the sake of conceptual simplicity, in some virtualization system implementations, these "components" are at least partially implemented as constructs or emulations exposed to the VM by the VMM. One advantage of such an arrangement is that the VMM may be set up to expose "generic" devices, which facilitate VM migration and hardware platform-independence. In general, such functionality may be said to exist in the VM or the VMM.

Figure 4:
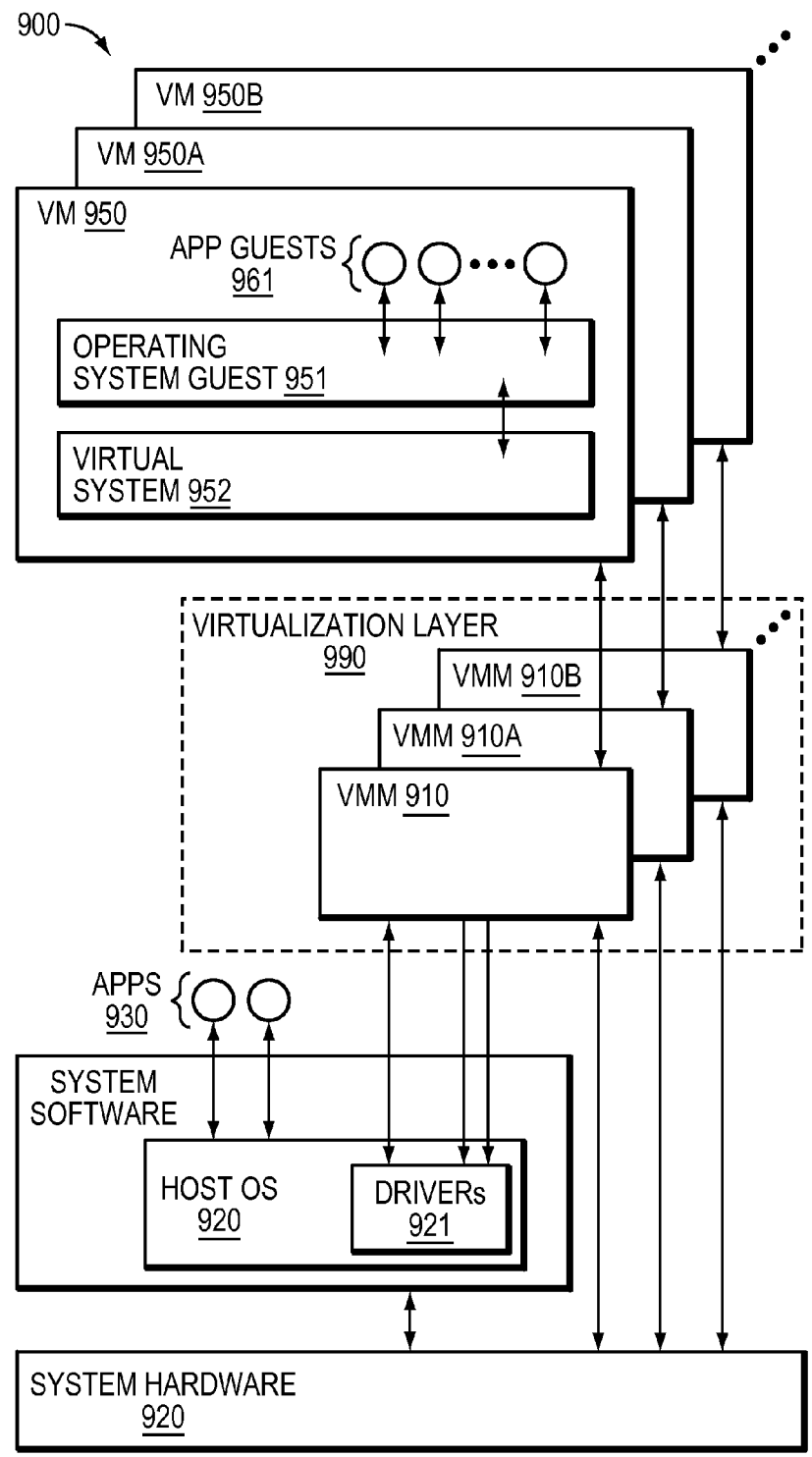
Figure 5:
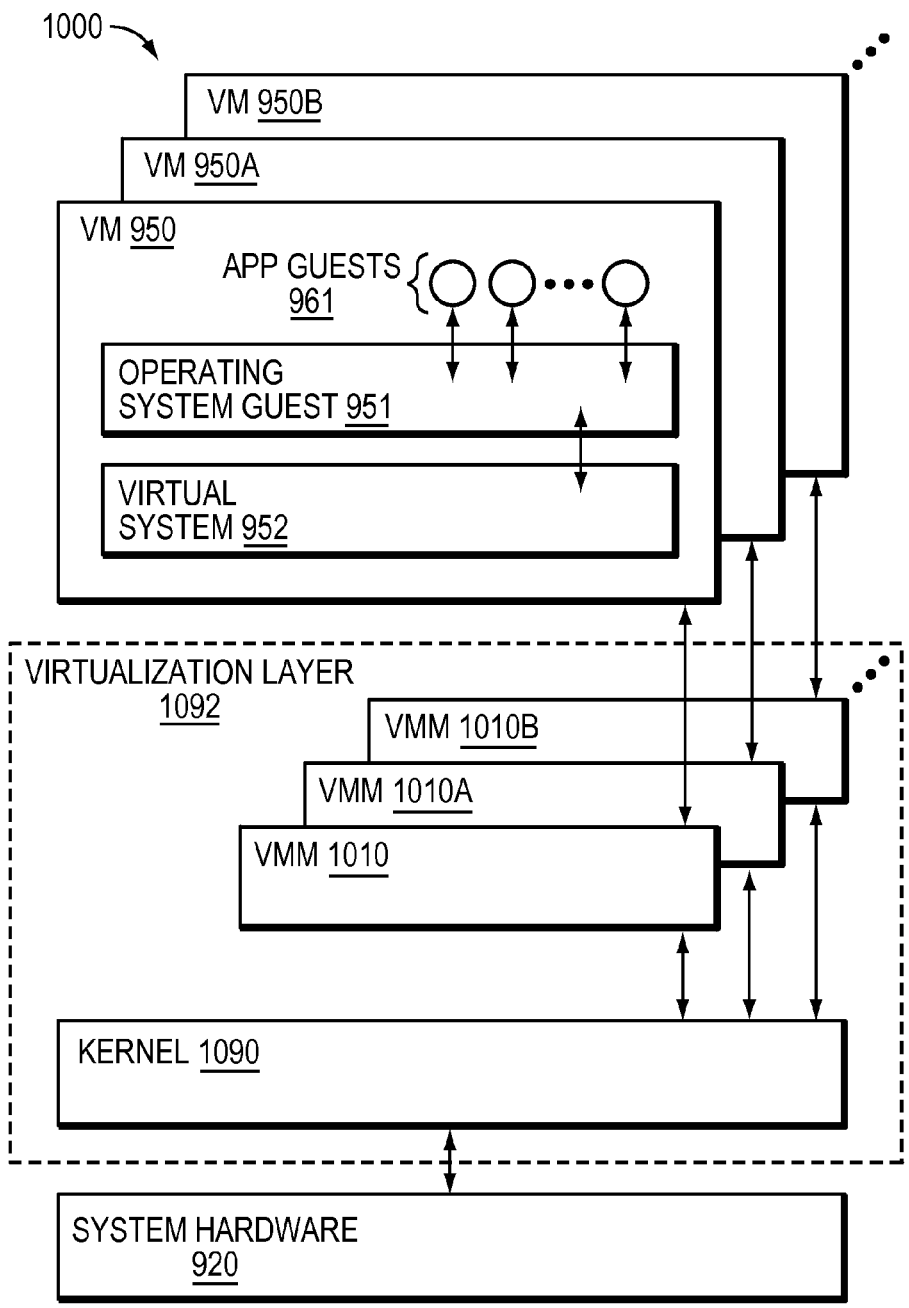

It is noted that while VMMs have been illustrated as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) executed in coordination with the host operating system. Such configurations, sometimes described as "hosted" and "non-hosted" configurations, are illustrated in FIGS. 4 and 5. However, the description herein refers to the physical system that hosts a virtual machine(s) and supporting components, whether in the "hosted" or "non-hosted" configuration, as a virtual machine host. To avoid confusion, the "hosted" configuration will be referred to herein as "OS hosted" and the "non-hosted" configuration will be referred to as "non-OS hosted." In the "OS hosted" configuration, an existing, general-purpose operating system (OS) acts as a "host" operating system that is used to perform certain I/O operations. In the "non-OS hosted" configuration, a kernel customized to support virtual machines takes the place of the conventional operating system.

With respect to OS hosted virtual computers, FIG. 4 depicts an embodiment of a virtualization system configuration referred to as an "OS hosted" configuration. Virtualization system 900 includes virtual machines 950, 950A, and 950B and respective virtual machine monitors VMM 910, VMM 910A, and VMM 910B. Virtualization system 900 also includes virtualization layer 990, which includes VMMs 910, 910A, and 910B. VMMs 910, 910A, and 910B are co-resident at system level with host operating system 920 such that VMMs 910, 910A, and 910B and host operating system 920 can independently modify the state of the host processor. VMMs call into the host operating system via driver 921 and a dedicated one of user-level applications 930 to have host OS 920 perform certain I/O operations on behalf of a corresponding VM. Virtual machines 950, 950A, and 950B in this configuration are thus hosted in that they run in coordination with host operating system 920. Virtual machine 950 is depicted as including application guests 961, operating system guest 951, and virtual system 952. Virtualization systems that include suitable facilities are available in the marketplace. For example, VMware® Server virtual infrastructure software available from VMware, Inc., Palo Alto, Calif. implements an OS hosted virtualization system configuration consistent with the illustration of FIG. 4; and VMware® Workstation desktop virtualization software, also available from VMware, Inc. also implements a hosted virtualization system configuration consistent with the illustration of FIG. 4.

With respect to non-OS hosted virtual computers, FIG. 5 depicts an embodiment of a virtualization system configuration referred to as a "non-OS hosted" virtual machine configuration. In FIG. 5, virtualization system 1000 includes virtual machines 950, 950A, and 950B as in FIG. 4. In contrast to FIG. 4, virtualization layer 1092 of FIG. 5 includes VMMs 1010, 1010A, and 1010B, and dedicated kernel 1090. Dedicated kernel 1090 takes the place, and performs the conventional functions, of a host operating system. Virtual computers (e.g., VM/VMM pairs) run on kernel 1090. Virtualization systems that include suitable kernels are available in the marketplace. For example, ESX Server™ virtual infrastructure software available from VMware, Inc., Palo Alto, Calif. implements a non-hosted virtualization system configuration consistent with the illustration of FIG. 5.

Different systems may implement virtualization to different degrees—"virtualization" generally relates to a spectrum of definitions rather than to a bright line, and often reflects a design choice in respect to a trade-off between speed and efficiency and isolation and universality. For example, "full virtualization" is sometimes used to denote a system in which no software components of any form are included in the guest other than those that would be found in a non-virtualized computer; thus, the OS guest could be an off-the-shelf, commercially available OS with no components included specifically to support use in a virtualized environment.

With respect to para-virtualization, as the term implies, a "para-virtualized" system is not "fully" virtualized, but rather a guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the OS guest (in particular, its kernel) is specifically designed to support such an interface. According to this definition, having, for example, an off-the-shelf version of Microsoft Windows XP as the OS guest would not be consistent with the notion of para-virtualization. Others define the term para-virtualization more broadly to include any OS guest with any code that is specifically intended to provide information directly to the other virtualization software. According to this definition, loading a module such as a driver designed to communicate with other virtualization components renders the system para-virtualized, even if the OS guest as such is an off-the-shelf, commercially available OS not specifically designed to support a virtualized computer system.

Unless otherwise indicated or apparent, virtualized systems herein are not restricted to use in systems with any particular "degree" of virtualization and are not to be limited to any particular notion of full or partial ("para-") virtualization.

In the preferred embodiment, the embodiment operates in cooperation and may be a part of computer software, operating the preferred EMC CLARiiON or Symmetrix storage systems available from EMC Corporation of Hopkinton, Mass., although one skilled in the art will recognize that the current technique may be used with other data storage systems. In the preferred embodiment, EMC CLARiiON storage system implements aspects of the current technique as part of software that operates with such a storage system.

In the preferred embodiment, VMware virtual processing includes the VMware ESX Server technology and provides a VMM and a VM that has at least one virtual processor and is operatively connected to the VMM for running a sequence of VM instructions, which are either directly executable or non-directly executable. VMware technology, including the ESX server, is described in U.S. Pat. No. 6,397,242 to Devine et. al, issued May 28, 2002, which is hereby incorporated in its entirety by this reference.

Figure 6:
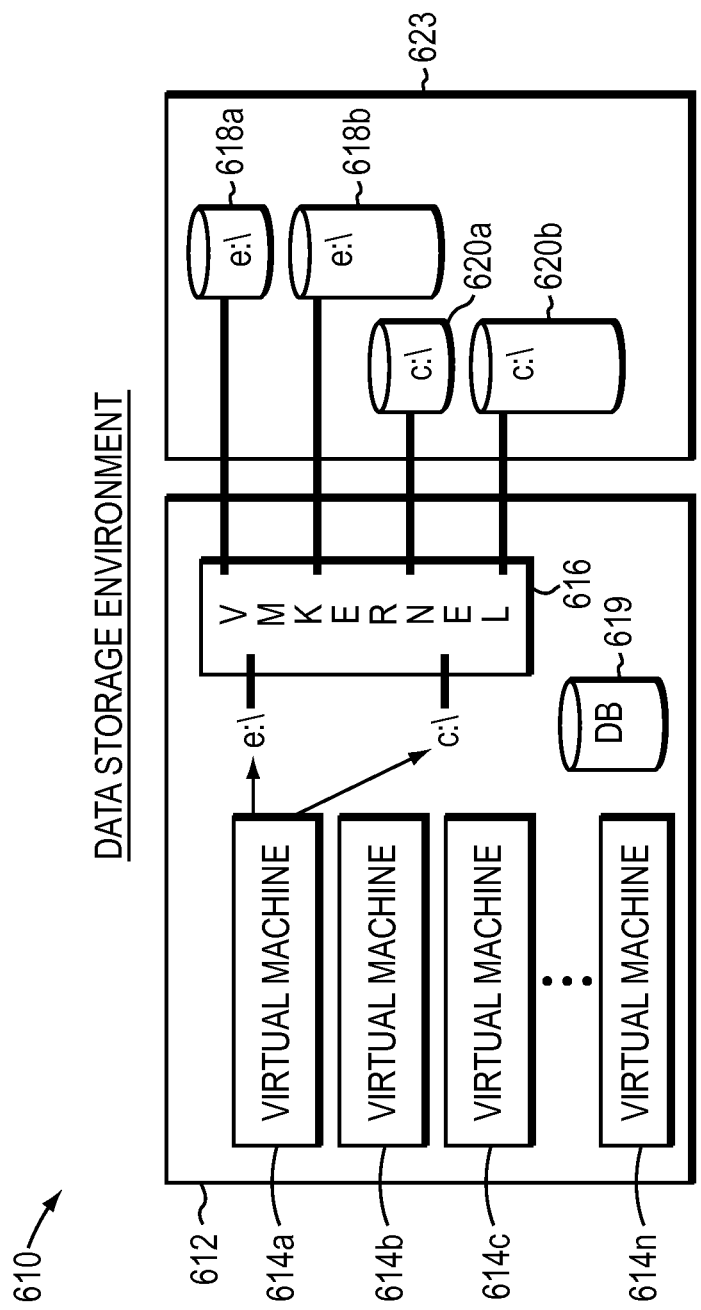

In a preferred embodiment, referring to FIG. 6, a Data Storage Environment 610 is shown including a VMware ESX Server 612 having a series of Virtual Machines 614*a-n*, a database 619 and VM Kernel 616. Server 612 engages on Data Storage System 623 logical units 618*a-b* and 620*a-b*, designated with virtual drive designations e: \ and c:\, respectively.

The VMware ESX Server is configured to boot Virtual Machines (VMs) from external storage. In the example case of a preferred embodiment shown in FIG. 6, a Data Storage System 623 (e.g., EMC CLARiiON) contains both the boot volume (c:\) and another volume (e:\) for a preferred Windows 2000 VM. Any VMware-supported Guest operating system would work in view of the teachings herein. Currently, such Guest operating systems include most of the popular x86 operating systems, including Windows and Linux. Similarly, additional drives could be added, up to half the supported number of Logical Unit Numbers (LUNs) on an ESX Server.

Figure 7:
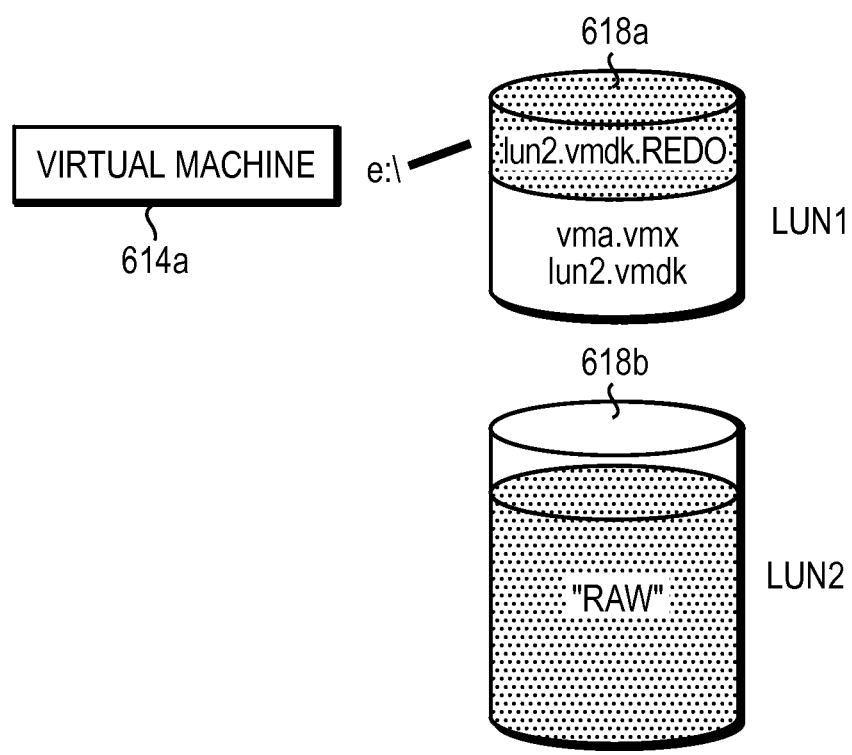

Regarding FIG. 7, taking a closer look at one of the volume pairs that has been discussed with reference to FIG. 6, it can be seen that logical volume 618*a* also known as LUN 1 has the VMware VM configuration (.vmx) file. It also has the two other files that comprise the e:\ drive for Virtual Machine 614*a*. First, LUN 1 has a pointer—called lun2.vmdk—to the "raw disk" at logical volume 18*a* also known as LUN 2, where most of the data resides. Second, there is a standard VMware ESX Server ".REDO log" on LUN 1. This .REDO log contains tracks that have been changed since the last time a .REDO log had been written out, or flushed, to LUN 2. This uses the preferred VMware VMFS "raw disk mapping" (RDM) functionality. The VMkernel 616 of FIG. 6 presents one e:\ drive to the Virtual Machine 614*a* from a combination of data it finds on the two LUNs 618*a* and 618*b*.

Figure 8:
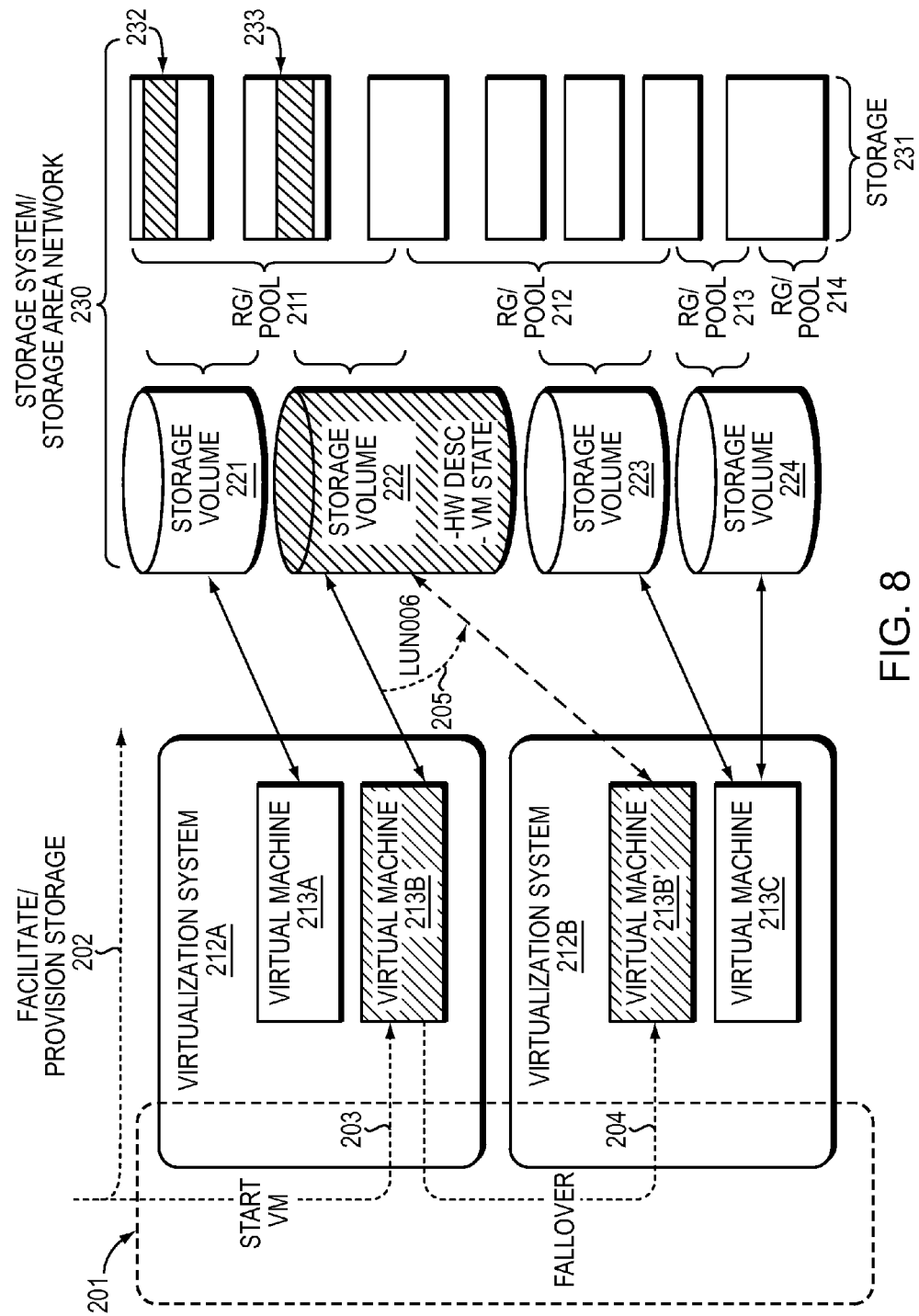

FIG. 8 illustrates an embodiment in which a coordination and provisioning system 201 (such as VMware® vCenter™ Server) is employed to facilitate provisioning of storage (202), e.g., LUNs, derived from underlying storage media 231 (and RAID groups (RGs) or pools 211, 212, 213 and 215) of storage system or storage area network (SAN) 230 and to provision, control and coordinate (see 203) execution of virtual machine instances (e.g., VMs 213A, 213B, 213C and 213D) on respective virtualization systems 212A and 212B.

Thus, for example, portions 232 and 233 of storage 231 may be provisioned from RAID group or pool 211 as storage volume 222 (LUN006) which may encode an encapsulation of an exposed virtual disk(s) and virtual machine state. System 201 may be used to handle a failover situation (204) for the virtual machine instances so that, for example, virtual machine instance 213B' can take over for a failed virtual machine instance 213B using LUN006. In general, a virtual server such as VMware® vCenter™ Server manages virtual machines. A virtual machine is associated with a unique identifier and information about its virtual devices, including virtual disks. Further, for example, vCenter™ Server as described above is part of a virtualized environment deployed using VMware® vSphere™.

In at least one embodiment of the current technique, VMware® vSphere™ provides management services such as a VMware® vCenter™ Agent that allows a vSphere™ hosts to connect to a vCenter™ Server for centralized management of hosts and virtual machines. Further, a VMware® vCenter™ Server is a centralized management tool for the VMware® vSphere™. Further, a VMware® vCenter™ Server enables management of one or more ESX servers and Virtual Machines (VMs) included in each ESX server using a single console application. Moreover, a VMware® vCenter™ Server provides storage administrators insight into the status and configuration of clusters, hosts, VMs, storage, operating systems, and other critical components of a virtual infrastructure from a single place (e.g., console application). Further, a VMware® vCenter™ Server may be installed on a physical or virtual machine. In a virtualized environment such as VMware® vSphere™ environment, a vCenter™ Server instance manages a set of ESX servers and storage resources associated with the set of ESX servers. Storage devices of a data storage system are used and managed by a vCenter™ Server instance. Further, a user of a VMware® vSphere™ client may access inventory and configuration information from one or more vCenter™ Servers. A user of a vSphere™ client may view storage information using an instance of a virtual server (e.g., vCenter™ Server instance) if the user possess valid permissions for accessing the virtual server. A single instance of vCenter™ Server provides capability to manage hundreds of hosts, and thousands of virtual machines. Further, one or more vCenter™ Servers may be linked together to provide capability to manage thousands of hosts and tens of thousands of virtual machines using one or more vCenter™ Server instances via a single management console (e.g. a VMware® vSphere™ client).

Further, a vCenter™ Server includes a status component that displays the health of components of the vCenter™ Server thereby enabling storage administrators to quickly identify and correct failures that may occur in a vCenter™ management infrastructure. In at least one embodiment of the current technique, a virtual system (e.g., VM, ESX™ Server) includes a storage tab that is displayed in a graphical user interface on a management console of the virtual system such that storage entities of a virtualized environment may be managed using storage information provided in the storage tab.

Generally, a storage array management agent or server utility or a virtual server (e.g., VMware® ESX™ server, Microsoft® Hyper-V™ server) itself pushes and/or registers in-band a host name and host IP address to a storage array (also referred to as "data storage system"). From the storage array side in the implementation, a user enters credentials for accessing the virtual server via Web or Common Information Model (CIM) service on the virtual server, which credentials are saved on the storage array. The storage array polls the virtual server for storage usage information and correlates the storage usage information with other information on the storage array to achieve end to end VM to storage array logical storage unit mapping.

Figure 9:
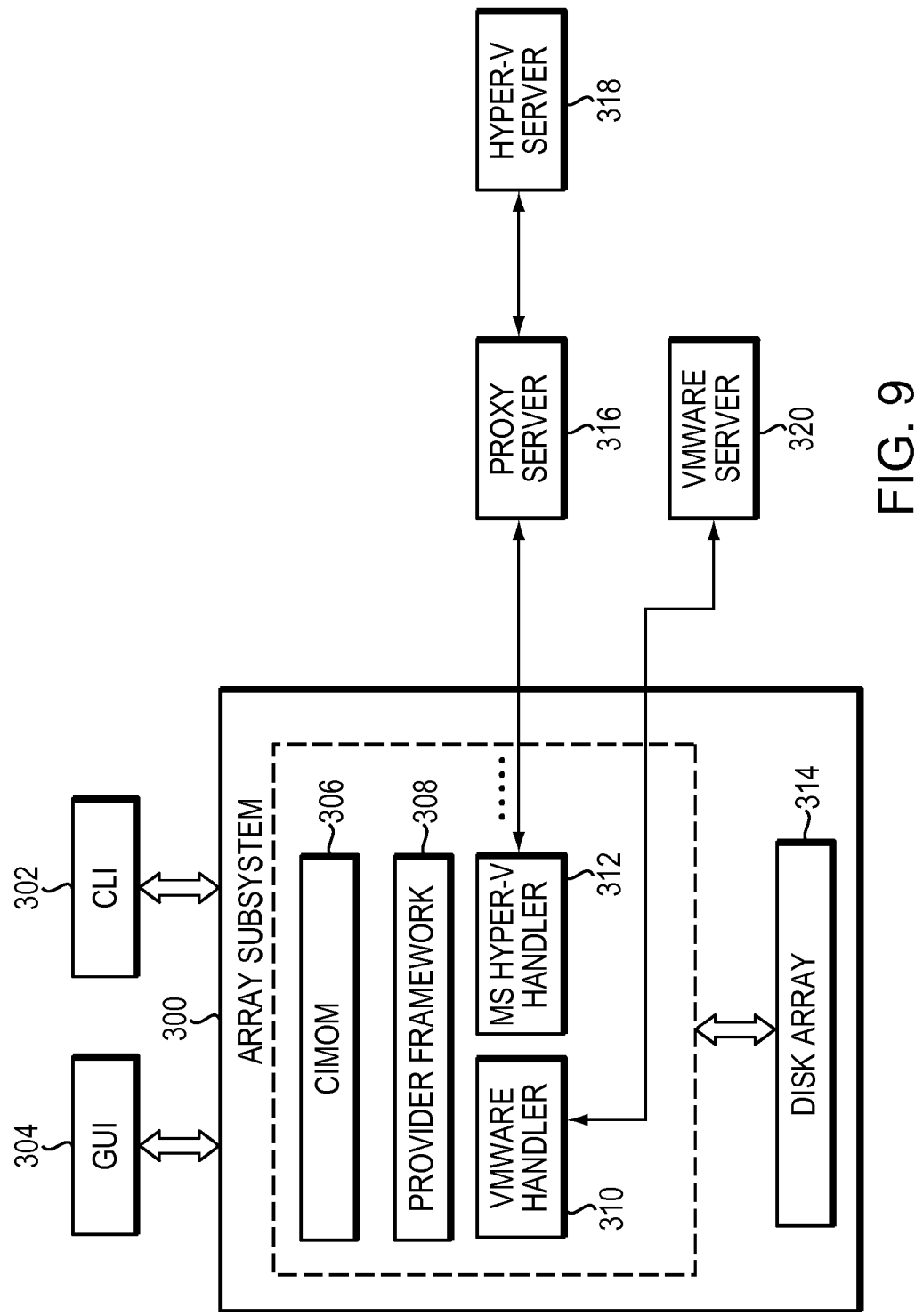

Referring to FIG. 9, shown is a more detailed representation of components that may be included in an embodiment using the techniques described herein. Generally, a hypervisor is a software that executes on a hardware platform as an operating system program. A Hyper-V™ server 318 is a hypervisor-based technology provided by Microsoft®. In at least one embodiment of the current technique, VMware® server 320 may be an instance of vCenter™ Server or ESX™ server. Further, VMware server 320 may be any one of virtual servers provided by VMware®. Proxy server 316 acts a proxy host system and communicates with data storage system 300 and Hyper-V™ server 318 such that Hyper-V™ server 318 may be managed using the proxy server 316.

In at least one embodiment of the current technique, storage entities of disk array 314 may be managed by a CIM object manager (CIMOM) 306. CIMOM 306 is an object manager configured in accordance with the Storage Network Industry Association Common Information Model (SNIA/CIM) standard or protocol and receives requests from a client. CIMOM 306 provides a framework for services offered by providers that plug into it, such as provider framework 308 with which it is operatively coupled. A provider is a plug-in into the CIMOM that provides a specific service, such as managing a storage feature. A storage management software application can use a CIM client to connect to a CIMOM, to retrieve information about the storage entities that the CIMOM manages, and also to perform active configuration of the storage entities. Further, a user interface such as graphical user interface 304 ("GUI") and command line interface 302 ("CLI") communicates with CIMOM 306 in order to retrieve information regarding virtual servers such as Hyper-V™ server 318 and VMware® server 320. In at least one embodiment of the current technique, CIMOM 306 communicates with a unified server management module such as provider framework 308 that includes a set of common functionality for managing virtual servers. Further, in at least one embodiment of the current technique, a specific handler module includes a set of functionality that is specific to the type of a virtual server that is being managed by data storage system 300. For example, VMware® handler 310 is a specific handler module for VMware® server 320 and Microsoft® Hyper-V™ handler 312 is a specific handler module for Hyper-V™ server 318.

In at least one embodiment of the current technique, specific handler modules 310, 312 may be implemented as dynamic link libraries (DLLs) that are loaded into the CIMOM 306. Accordingly, they can "plug in" to provider framework 308 in a modular fashion and are thereby communicatively coupled to CIMOM 306. The specific handler modules may be removed, depending on whether or not their functionality is essential for operation of the system and others (not shown) may be added by plugging-in to framework 308. An array administrator or administration interface (e.g., GUI 304, CLI 302) is the interface through which all storage system management is performed, regardless of which array feature or driver may be targeted.

In at least one embodiment of the current technique, the provider framework 308 (also referred to herein as "server provider") includes a set of functionality that uses a common terminology for information regarding different types of virtual servers even though a user interface displays the information of a virtual server using a terminology that is based on a storage format used by the virtual server based on the type of the virtual server. The provider framework 308 retrieves information of a virtual server, stores the information, and polls the virtual server for retrieving updated information of the virtual server and VM information. In addition, the provider framework 308 creates and maintains objects for virtual machines which allow end to end mapping, which, for example, allows LUNs to be correctly mapped, remapped, or transferred in a virtual server infrastructure environment. Further, provider framework 308 uses an access logix provider module in order to retrieve a list of host systems that have been registered by a host agent module. Further, a host agent module executes on a host system such that the host agent module performs registration using a push mechanism and collects mapping of storage objects (e.g., a mapping of a storage device to a LUN). An access logix provider module retrieves storage system information using a data store that represents a storage location for virtual machine files and a user interface such as GUI 304 and CLI 302. Further, an access logix provider module retrieves registration information from a host agent module.

In at least one embodiment of the current technique, provider framework 308 implements one or more instances of poll targets. A poll target is also referred to as a managed server service. Further, a poll target includes information such as network address and credentials such that the information is provided by a user to provider framework 308 in or order to poll or manage a hypervisor using a service that may execute either on the hypervisor or off the hypervisor. Further, provider framework 308 creates one or more instances of managed servers (e.g., VMware® ESX Server™ 320 and Microsoft® Hyper-V™ server 318) and manages configuration of the managed servers such that each of the managed servers include VMs and storage provisioned for the VMs. A managed server object is created for a registered host if the registered host is either configured as a poll target or managed from a virtual server management infrastructure. Further, provider framework 308 implements a polling functionality that polls all registered hosts managed by poll targets.

In at least one embodiment of the current technique, VMware® handler 310 may be a VMware® Infrastructure Software Development Kit ("VISDK") client that allows creation and management of VMware® web service clients. Further, provider framework 308 may use VISDK client 310 that may be implemented as a shared library for connecting to VMware® server 320 (e.g., VMware® vCenter™ Server, VMware® ESX™ server). Further, provider framework 308 uses a storage lock box mechanism (e.g., a lock box shared library) that provides security for the provider framework 308, encrypts, and saves a poll target credentials and configuration information associated with the poll target to a persistent storage.

In at least one embodiment of the current technique, a user logs into a user interface such as GUI 304. The user enters credentials information (e.g. IP address) in order to access a virtual server. The provider framework 308 validates the credentials information. Data storage system determines the type of the virtual server. Next, provider framework 308 invokes an appropriate specific handler module based on the type of the virtual server. For example, if the user is attempting to access VMware® server 320, provider framework 308 invokes VMware® handler 310. The specific handler module that is invoked by provider framework 308 communicates with the virtual server and retrieves information regarding the virtual server. The information is cached on data storage system 300 such that if the user issues a request to retrieve information for the virtual server, provider framework 308 provides the storage information that is cached on data storage system 300 to the user by translating the cached information into a format used by the virtual server. Further, a user via a user interface may perform a forced poll for every virtual server connected to data storage system 300 in order to update the information cached in the data storage system 300.

Figure 10:
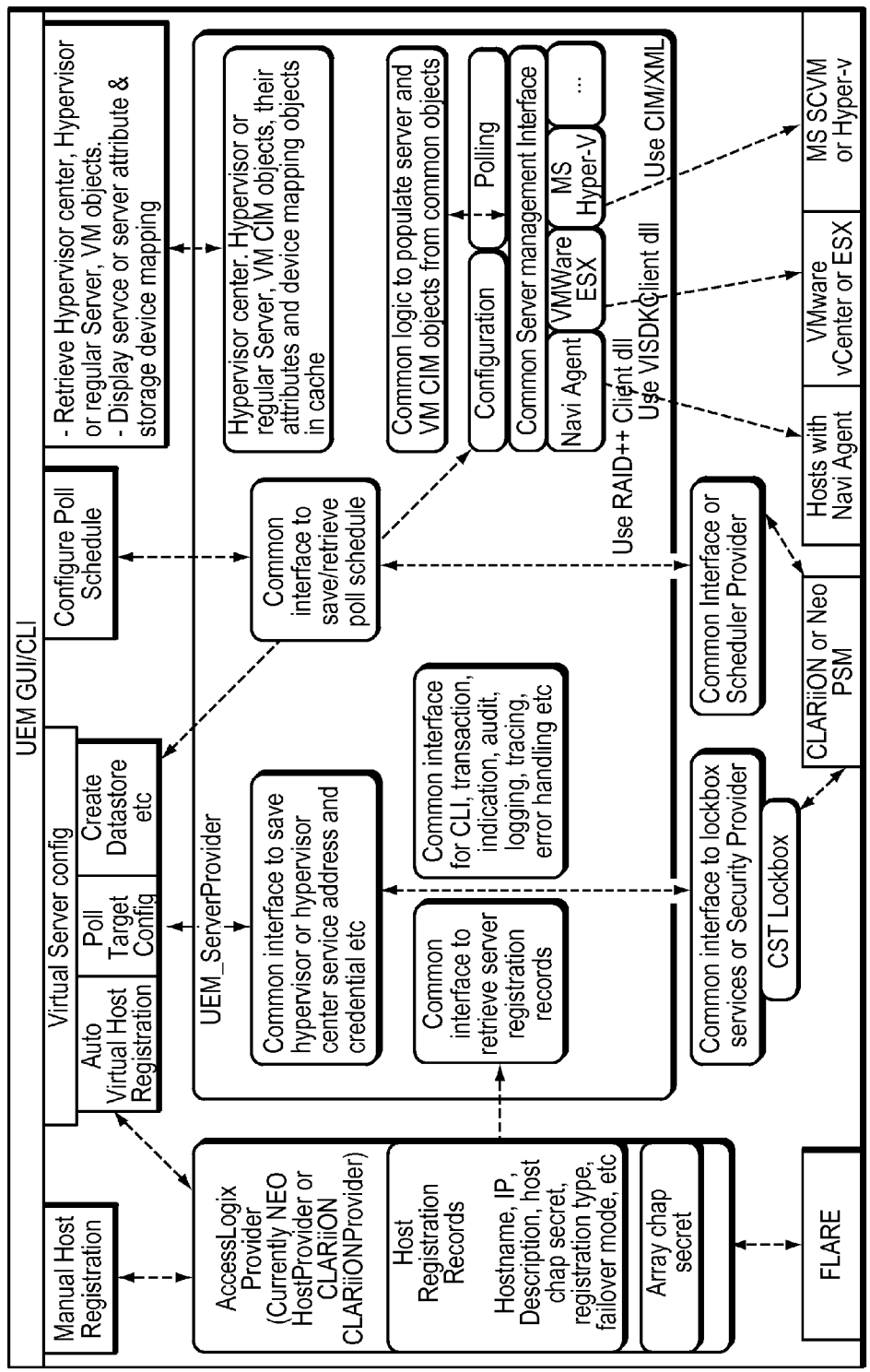

Referring to FIG. 10, shown is a more detailed representation of components that may be included in an embodiment using the techniques described herein. In at least one embodiment of the current technique, provider framework 306 indicated by a class "UEM_ServerProvider" provides services for modeling and managing virtual servers provided by vendors such as Microsoft® and VMware®. A poll target is configured in provider framework 308 in order to retrieve information regarding virtual servers. For example, VMware® vCenter™, ESX™ server, Microsoft® system center line of management and reporting tools ("SCVMM") and/or Microsoft® Hyper-V™ servers may be used as poll targets. Each poll target requires an IP address and/or a host name along with credentials information such as a username and password which is used to connect to a virtual server. The credentials information is placed into a lock box object.

In at least one embodiment of the current technique, a lock box securely stores entries defined by a user. Each entry of the lock box includes credentials (e.g., a user name, a password) information for a poll target managed by data storage system 300. Thus, the lock box includes credentials information for all poll targets managed by data storage system 300. Further, the lock box includes configuration information (e.g. an address of a poll target, a type of poll target, a description of a poll target) for a poll target in order to maintain credentials information associated with the poll target consistent and persistent. Further, in at least one embodiment of the current technique, configuration information for all poll targets managed by data storage system 300 may be stored in an XML file such that the XML file may be stored in the lock box as an entry of the lock box. Further, each entry of the lock box created by provider framework 308 also resides on one or more peer storage processors of data storage system 300. Thus, each time information regarding a poll target is updated on a storage processor, the one or more peer storage processors of the storage processor are notified to initiate a poll of the poll target such that the one or more peer storage processors may update information stored in their respective lock boxes.

In at least one embodiment of the current technique, provider framework 308 supports polling of virtual servers that are managed using poll targets. For each registered host, provider framework 308 determines a poll target that is used for polling. Provider framework 308 then polls the poll target in order to retrieve information for the registered hosts. The information retrieved by polling the poll target is used to instantiates CIM objects that model a virtual server associated with the poll target. Further, provider framework 308 automatically polls a virtual server if the virtual server is a registered host and resides in a host provider. Further, in at least one embodiment of the current technique, managed servers (also referred to as poll targets) may be polled at a regular time interval (e.g. every 24 hours). Further, a system administrator may be able to change a configuration setting that indicates a pre-defined time interval for polling the managed servers. Further, data storage system 300 may either perform a manual poll of a single managed server or a manual poll of all managed servers. Further, as part of a manual poll of a managed server, a rescan option may be used to force a rescan of storage provisioned for the managed server before the manual poll is performed. However, in such a case, the rescan may take a long time. Thus, provider framework 308 includes a rescan timeout indicating that if the rescan takes longer than the rescan timeout, the rescan fails and the manual poll continues polling the virtual server.

Further, provider framework 308 includes a poll server status that indicates status of a last poll that is either in a process of being executed or finished execution. A poll server status includes information such as whether the last poll is currently executing, whether the last poll succeeded, time at which the last poll started and time at which the last poll finished executing, a percentage of polling that has been completed, and any errors reported during the last poll.

In at least one embodiment of the current technique, provider framework 308 uses a specific handler module for connecting to a virtual server based on a type of the virtual server. For example, provider framework 308 may use VMware® handler 310 that may be implemented as a shared library (e.g., "VISDKClient.dll") in order to access web services executing on a virtual server from VMware®. The VISDKClient.dll library provides an interface that allows provider framework 308 to connect to a virtual server (e.g., VMware® vCenter™, ESX™ server), retrieve information of the virtual server, and manage a datastore of the virtual server. Further, the VISDKClient.dll allows concurrent access to a virtual server by creating multiple instances of the VISDKClient object. A single instance of the VISDKClient object may only connect to one virtual server. Similarly, provider framework 308 uses Microsoft® Hyper-V™ handler 312 module to access a proxy server provider executing on a remote proxy server 316 that helps provider framework 308 to communicate with a virtual server provided by Microsoft® such as Hyper-V™ server 318. Microsoft® Hyper-V™ handler 312 uses a CIM-XML based communication mechanism. A proxy server provider executing on remote proxy server 316 provides an interface that allows the provider framework 308 to retrieve information such as a list of Hyper-V™ Servers, virtual machines information, datastores information of Hyper-V™ server 318. Further, provider framework 308 retrieves a list of registered hosts from the access logix provider. Thus, provider framework 308 only polls and configures virtual servers that are registered with the access logix provider.

Figure 11:
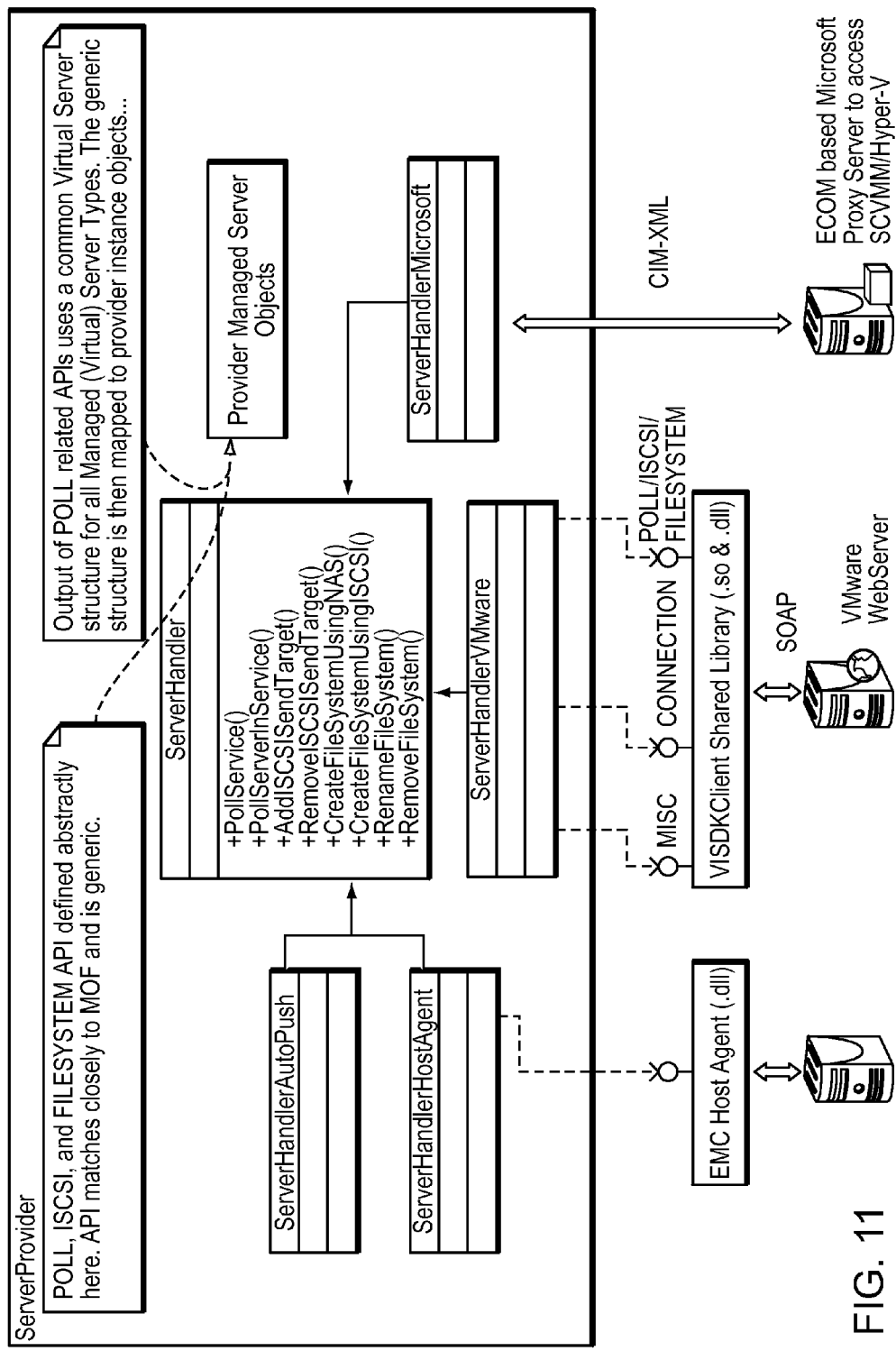

Referring to FIG. 11, shown is a general class structure used for an example implementation of a unified server management module (e.g., provider framework 308) and a specific handler module (e.g., VMware® handler 310, Hyper-V™ handler 312) that may be included in an embodiment using the techniques described herein. In at least one embodiment of the current technique, an output of an interface that is related to polling a virtual server uses a common virtual server structure for different types of virtual servers managed by data storage system 300. The common virtual server structure is then mapped to different instances of provider objects based on the type of a virtual server.

Figure 12:
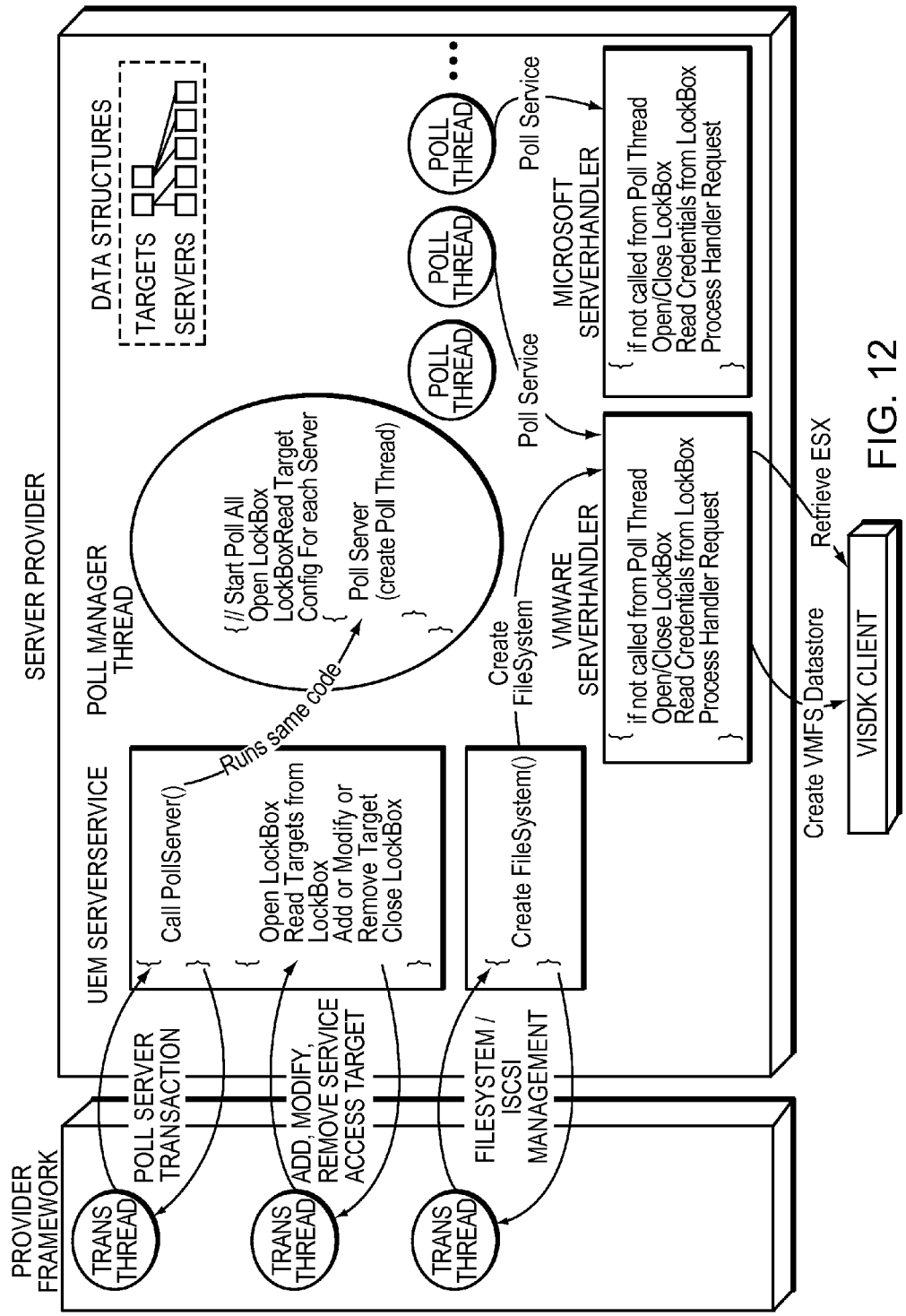
Figure 13:
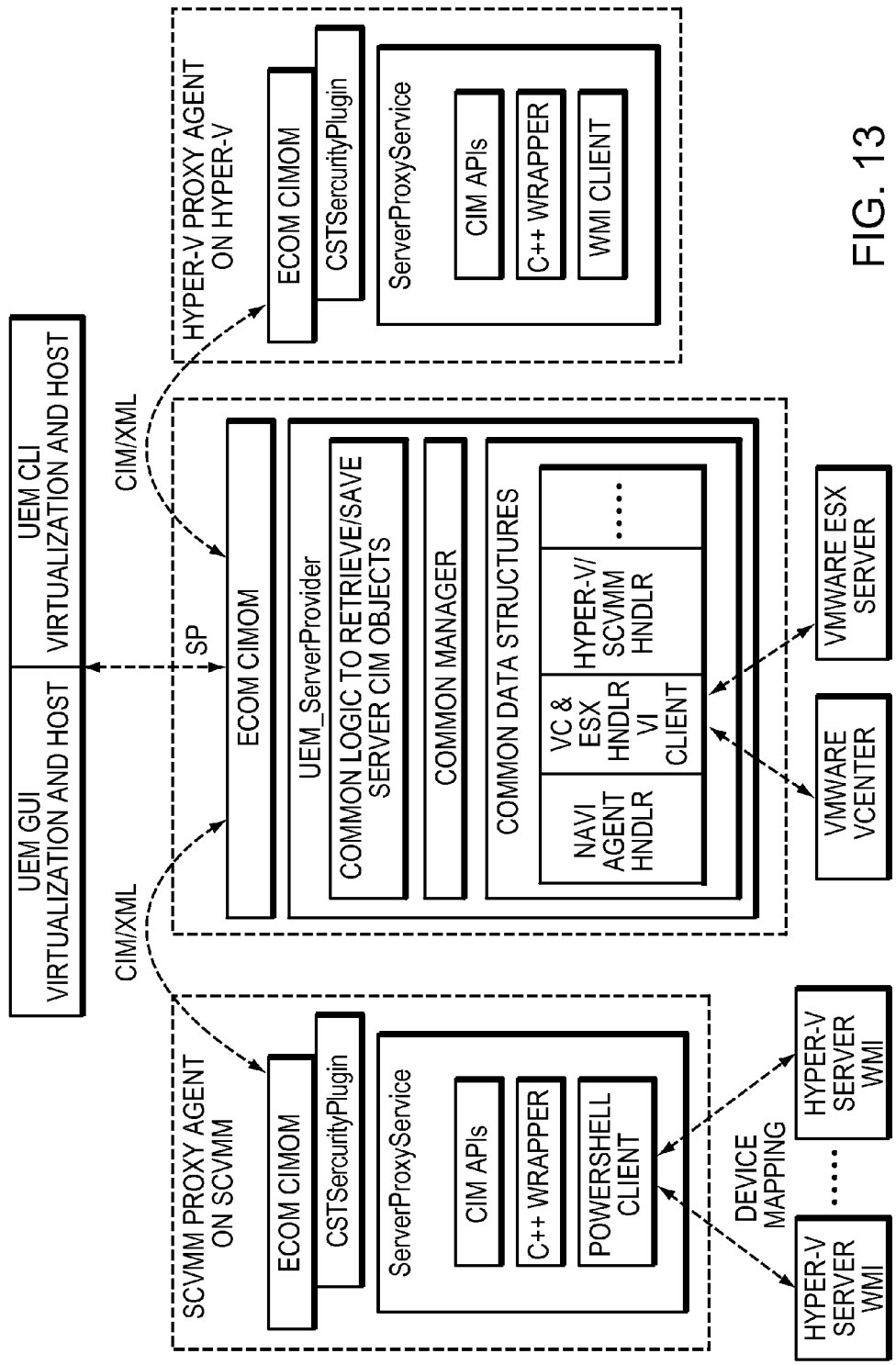

Referring to FIGS. 12 and 13, shown are more detailed representation of components that may be included in an embodiment using the techniques described herein. With reference also to FIG. 9, in at least one embodiment of the current technique, provider framework 308 includes a common management interface for supporting a poll target (also referred to as "managed server service") such as VMware® ESX Server™ 320 and Hyper-V™ server 318. The common management interface is defined in a "ServerHandler" class. The common management interface may be specialized for each managed server service based the type of the managed server service. A specialized handler class may use any one of the known communication mechanisms for accessing a poll target. For example, a "VMwareServerHandler" class that represents VMware® handler 310 may use the shared library "VISDKClient.dll" to access a web service of VMware® server 320. However, a class "MicrosoftServerHandler" may use an ECOM based proxy server 316 using a CIM-XML based communication mechanism in order to access Hyper-V™ Server 318. Further, a "ServerService" object includes interfaces that helps perform a user initiated polling and configuration of a poll target. Moreover, a "MsService" class includes interfaces associated with management of file systems and iSCSI. Further, provider framework 308 maintains a set of data structures in order to create a mappings between a poll target and a virtual server. The set of data structures helps the provider framework 308 find a poll target that may be used to poll a virtual server. Further, provider framework 308 uses multiple processes for polling virtual servers. A poll manager process (e.g. a "thread") continuously runs and executes a main poll loop processing such that an individual poll thread is created to poll a single virtual server. The individual poll thread only exists for the duration of a poll of a specific virtual server. Further, a maximum number of individual poll threads may exist at any given time such that the maximum numbers of virtual servers may be polled concurrently by the maximum number of individual poll threads. Further, for example, if the maximum number of individual poll threads is ten and one individual poll thread hangs indefinitely due to an error, nine individual threads may still be available to continue polling nine virtual servers.

Figure 14:
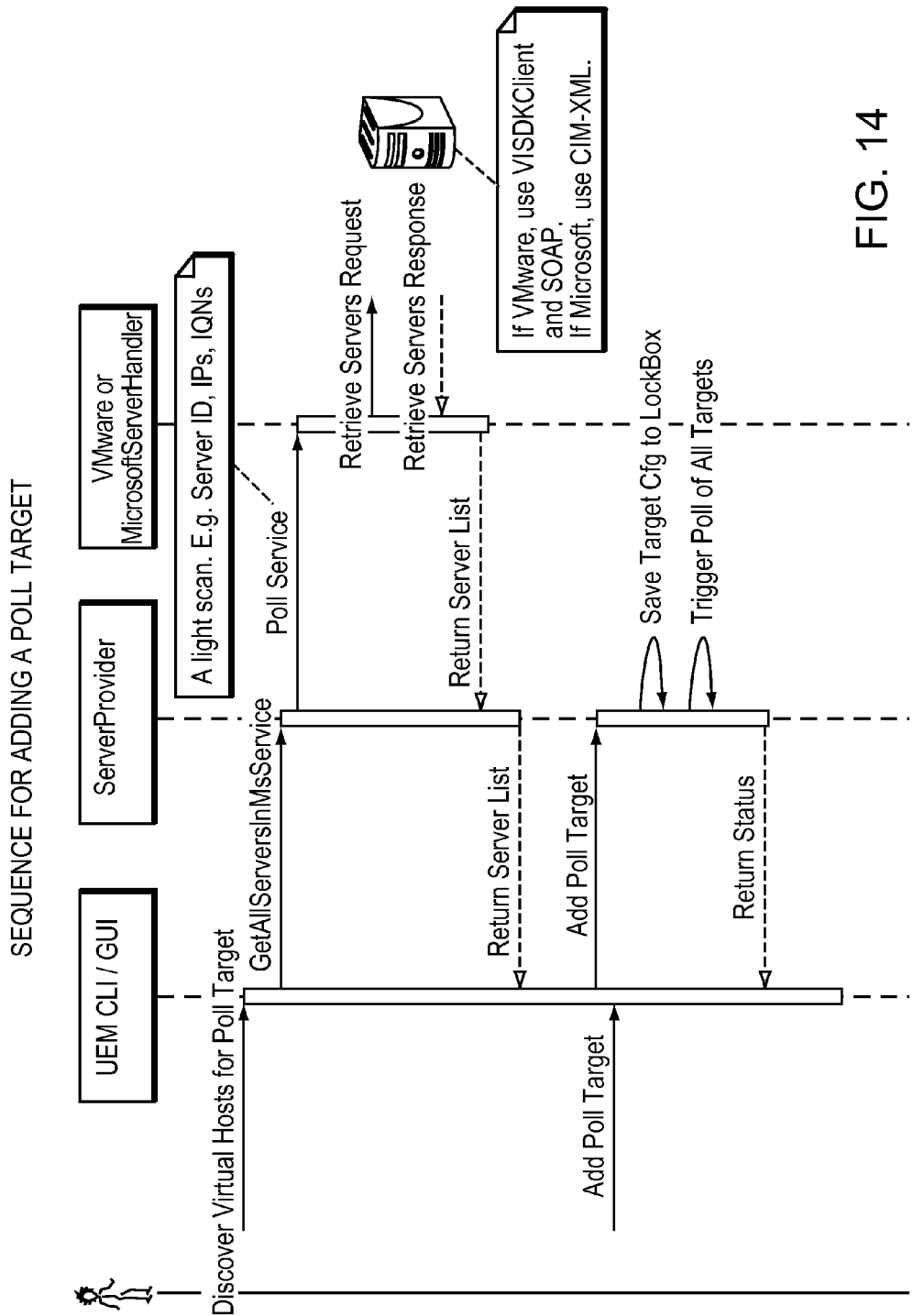
FIGS. 14-15 are diagrams illustrating an example of sequence of events that may be used in connection with techniques described herein.

Referring to FIG. 14, shown is a sequence for adding a poll target that may be included in an embodiment using the techniques described herein. With reference also to FIG. 9, in at least one embodiment of the current technique, a user discovers a virtual host that may be registered as a poll target. Provider framework 308 polls the virtual host and retrieves information regarding the virtual host such that the virtual host may be added as a registered host to a poll target.

Figure 15:
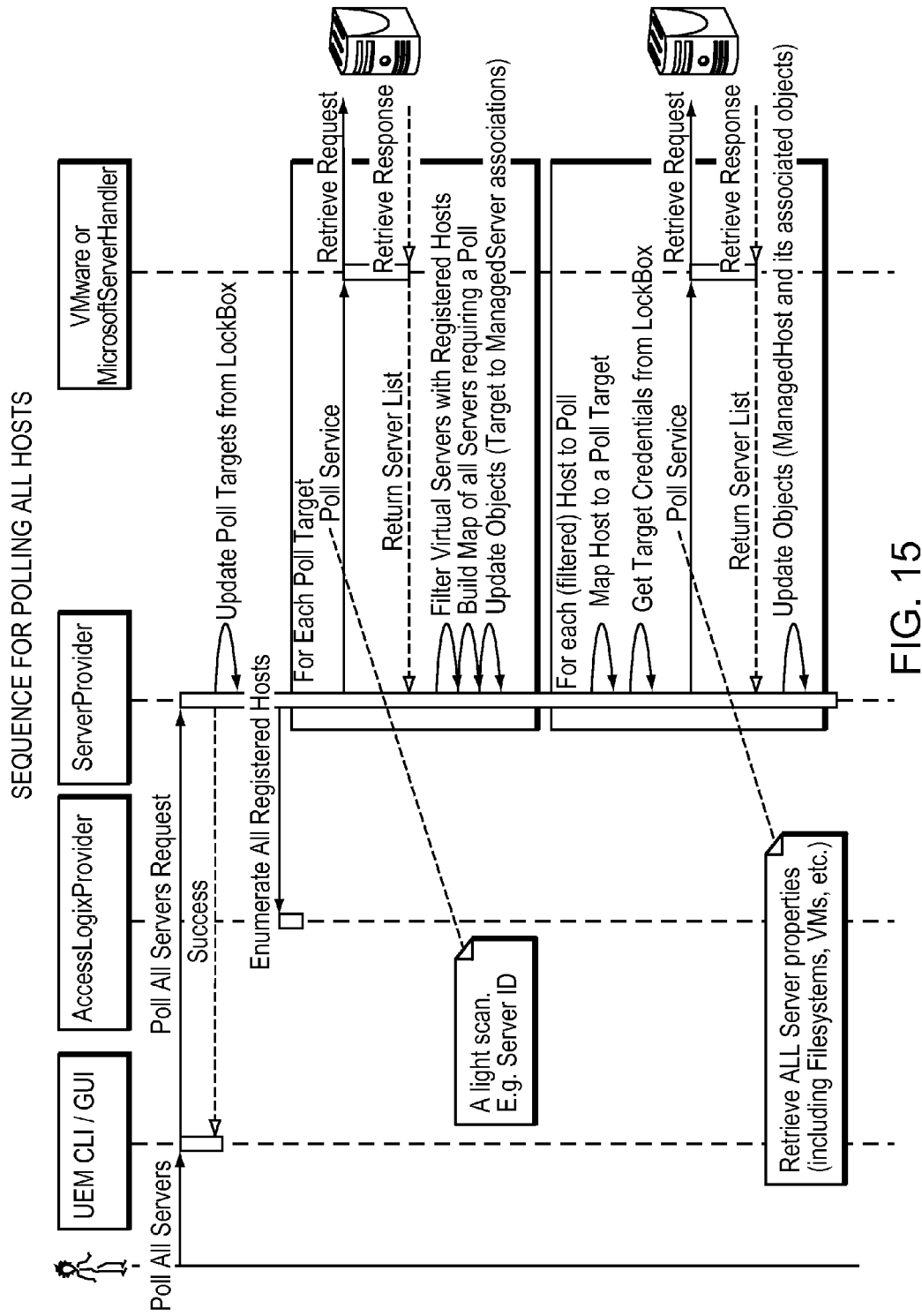

Referring to FIG. 15, shown is a sequence for polling a registered host that may be included in an embodiment using the techniques described herein. With reference also to FIG. 9, in at least one embodiment of the current technique, a user performs polling of all virtual hosts that are registered as poll targets. For each poll target, provider framework 308 retrieves a list of virtual servers, filters the list of virtual servers based on the list of registered hosts, builds a map of all virtual servers that require polling, and update objects based on the information retrieved from polling the virtual servers. Further, each filtered host that requires polling, provider framework 308 maps a registered host to a poll target and polls the poll target in order to retrieve information such as server properties of a virtual server associated with the poll target.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing virtual systems in data storage systems, the method comprising:
managing first and second virtual systems by a data storage system, wherein the first virtual system uses a first format for communicating with the data storage system and the second virtual system uses a second format for communicating with the data storage system, wherein the data storage system stores information regarding the first and second virtual systems; and
using a universal virtual system management module of the data storage system for communicating with the first and second virtual systems, wherein the universal virtual system management module communicates with the first virtual system by using a first virtual system handler configured to communicate based on the first format, wherein the universal virtual system management module communicates with the second virtual system by using a second virtual system handler configured to communicate based on the second format, wherein the universal virtual system management module includes a set of management interfaces and management functionalities common to the first and second virtual systems, wherein the first and second virtual system handlers are dynamically loaded programs, wherein using the universal virtual system management module for communication further comprising:
receiving a request to access information regarding a virtual system, wherein the request is processed by the universal virtual system management module;
by the universal virtual system management module, determining a type of the virtual system;
based on the type of the virtual system, determining a virtual system handler associated with the virtual system, wherein the virtual system handler includes a set of functionality specific to the type of the virtual system;
retrieving the information from the virtual system, wherein the virtual system handler communicates with the virtual system to retrieve the information;
providing the information retrieved from the virtual system in a format based on the type of the virtual system, wherein a user interface displays the information of the virtual system based on a storage format used by the virtual system; and
polling the virtual system for retrieving updated information associated with the virtual system, wherein the data storage system polls the first and second virtual systems for the information comprising of storage usage information.

2. The method of claim 1, further comprising:
using a proxy server for offloading a subset of processing for managing the second virtual system, wherein the proxy server communicates with the second virtual system and the data storage system.

3. The method of claim 1, wherein the first virtual system includes a Virtual Center server and the first format is based on VASA interfaces.

4. The method of claim 1, wherein the second virtual system includes a Hyper-V server.

5. The method of claim 1, wherein the universal virtual system management module executes on a remote proxy host in communication with the data storage system.

6. The method of claim 1, further comprising:
creating first and second poll targets, wherein the first poll target is associated with the first virtual system and the second poll target is associated with the second virtual system; and
polling the first and second poll targets to retrieve information regarding the first and second virtual systems.

7. The method of claim 6, wherein the first and second poll targets are polled concurrently.

8. A system for use in managing virtual systems in data storage systems, the system comprising a processor configured to:
manage first and second virtual systems by a data storage system, wherein the first virtual system uses a first format for communicating with the data storage system and the second virtual system uses a second format for communicating with the data storage system, wherein the data storage system stores information regarding the first and second virtual systems; and
use a universal virtual system management module of the data storage system for communicating with the first and second virtual systems, wherein the universal virtual system management module communicates with the first virtual system by using a first virtual system handler configured to communicate based on the first format, wherein the universal virtual system management module communicates with the second virtual system by using a second virtual system handler configured to communicate based on the second format, wherein the universal virtual system management module includes a set of management interfaces and management functionalities common to the first and second virtual systems, wherein the first and second virtual system handlers are dynamically loaded programs, wherein use of the universal virtual system management module for communication further comprising:
receive a request to access information regarding a virtual system, wherein the request is processed by the universal virtual system management module;
by the universal virtual system management module, determine a type of the virtual system;
based on the type of the virtual system, determine a virtual system handler associated with the virtual system, wherein the virtual system handler includes a set of functionality specific to the type of the virtual system;
retrieve the information from the virtual system, wherein the virtual system handler communicates with the virtual system to retrieve the information;
provide the information retrieved from the virtual system in a format based on the type of the virtual system, wherein a user interface displays the information of the virtual system based on a storage format used by the virtual system; and
poll the virtual system for retrieving updated information associated with the virtual system, wherein the data storage system polls the first and second virtual systems for the information comprising of storage usage information.

9. The system of claim 8, further comprising:
use a proxy server for offloading a subset of processing for managing the second virtual system, wherein the proxy server communicates with the second virtual system and the data storage system.

10. The system of claim 8, wherein the first virtual system includes a Virtual Center server and the first format is based on VASA interfaces.

11. The system of claim 8, wherein the second virtual system includes a Hyper-V server.

12. The system of claim 8, wherein the universal virtual system management module executes on a remote proxy host in communication with the data storage system.

13. The system of claim 8, further comprising:
create first and second poll targets, wherein the first poll target is associated with the first virtual system and the second poll target is associated with the second virtual system; and
poll the first and second poll targets to retrieve information regarding the first and second virtual systems.

14. The system of claim 13, wherein the first and second poll targets are polled concurrently.

* * * * *